United States Patent
Park et al.

(10) Patent No.: US 11,715,823 B2
(45) Date of Patent: Aug. 1, 2023

(54) ELECTRODE STRUCTURE AND METHOD OF MANUFACTURING THE SAME, AND SECONDARY BATTERY INCLUDING THE ELECTRODE STRUCTURE

(71) Applicant: SAMSUNG ELECTRONICS CO., LTD., Suwon-si (KR)

(72) Inventors: Hwiyeol Park, Hwaseong-si (KR); Huisu Jeong, Seongnam-si (KR); Kyounghwan Kim, Seoul (KR); Jeongkuk Shon, Hwaseong-si (KR); Junhyeong Lee, Seoul (KR); Sungjin Lim, Suwon-si (KR); Jin S. Heo, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 502 days.

(21) Appl. No.: 16/658,635

(22) Filed: Oct. 21, 2019

(65) Prior Publication Data

US 2020/0161642 A1    May 21, 2020

(30) Foreign Application Priority Data

Nov. 20, 2018   (KR) ........................ 10-2018-0143898

(51) Int. Cl.
| | |
|---|---|
| *H01M 4/36* | (2006.01) |
| *H01M 4/139* | (2010.01) |
| *H01M 4/485* | (2010.01) |
| *H01M 4/58* | (2010.01) |
| *H01M 10/0525* | (2010.01) |

(Continued)

(52) U.S. Cl.
CPC ........... *H01M 4/366* (2013.01); *H01M 4/043* (2013.01); *H01M 4/0471* (2013.01); *H01M 4/139* (2013.01); *H01M 4/485* (2013.01); *H01M 4/5825* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | |
|---|---|---|
| 6,192,789 B1 | 2/2001 | Agcaoili et al. |
| 6,632,554 B2 | 10/2003 | Doshi et al. |

(Continued)

FOREIGN PATENT DOCUMENTS

| | | |
|---|---|---|
| EP | 3648203 A1 | 5/2020 |
| JP | 2012099405 A | 5/2012 |

(Continued)

OTHER PUBLICATIONS

European Search Report for European Patent Application No. 19208816.9 dated Mar. 27, 2020.

(Continued)

*Primary Examiner* — Anca Eoff
(74) *Attorney, Agent, or Firm* — Cantor Colburn LLP

(57) ABSTRACT

An electrode structure includes a base layer including a first active material, and a plurality of active material plates on a first surface of the base layer and spaced apart from one another, the plurality of active material plates including a second active material. An active material density of the base layer is less than an active material density of an active material plate of the plurality of active material plates.

32 Claims, 23 Drawing Sheets

(51) Int. Cl.
*H01M 4/02* (2006.01)
*H01M 4/04* (2006.01)

(56) References Cited

U.S. PATENT DOCUMENTS

| | | |
|---|---|---|
| 7,553,584 B2 | 6/2009 | Chiang et al. |
| 7,846,579 B2 | 12/2010 | Krasnov et al. |
| 8,597,722 B2 | 12/2013 | Albano et al. |
| 8,900,743 B2 | 12/2014 | Kim et al. |
| 9,012,084 B2 | 4/2015 | Yada et al. |
| 9,065,093 B2 | 6/2015 | Chiang et al. |
| 9,742,038 B2 | 8/2017 | Kim et al. |
| 9,979,043 B2 | 5/2018 | Yang et al. |
| 10,177,372 B2 | 1/2019 | Park et al. |
| 10,381,627 B2 | 8/2019 | Yang et al. |
| 2004/0248006 A1* | 12/2004 | Tsutsumi ............. H01M 4/32 429/223 |
| 2007/0259271 A1 | 11/2007 | Nanno et al. |
| 2008/0081256 A1 | 4/2008 | Madou et al. |
| 2010/0173204 A1* | 7/2010 | Sugiura ............. C01G 51/50 429/231.8 |
| 2012/0009471 A1 | 1/2012 | Sugiura et al. |
| 2012/0135292 A1 | 5/2012 | Buckingham et al. |
| 2013/0196226 A1* | 8/2013 | Lee ............. H01M 4/02 429/211 |
| 2014/0050959 A1* | 2/2014 | Ryu ............. H01M 10/0431 429/94 |
| 2014/0186698 A1 | 7/2014 | Cobb et al. |
| 2015/0180001 A1 | 6/2015 | Johnson et al. |
| 2015/0207171 A1 | 7/2015 | Chang et al. |
| 2016/0204464 A1 | 7/2016 | Cho et al. |
| 2016/0226064 A1 | 8/2016 | Kitayoshi |
| 2017/0040607 A1 | 2/2017 | Cho et al. |
| 2017/0084918 A1 | 3/2017 | Yang et al. |
| 2017/0104235 A1 | 4/2017 | Cho et al. |
| 2017/0256777 A1 | 9/2017 | Akikusa et al. |
| 2017/0324080 A1 | 11/2017 | Tuduki et al. |
| 2018/0062212 A1 | 3/2018 | Kim et al. |
| 2018/0114974 A1* | 4/2018 | Park ............. H01M 10/045 |

FOREIGN PATENT DOCUMENTS

| | | |
|---|---|---|
| JP | 2016058257 A | 4/2016 |
| JP | 2016213106 A | 12/2016 |
| KR | 1020040007492 A | 1/2004 |
| KR | 101288743 B1 | 7/2013 |
| KR | 101558775 B1 | 10/2015 |
| KR | 101569367 B1 | 11/2015 |
| KR | 1020160085624 A | 7/2016 |
| KR | 1020160088126 A | 7/2016 |
| KR | 1020170042935 A | 4/2017 |
| KR | 1020180025685 A | 3/2018 |
| KR | 1020180045317 A | 5/2018 |
| WO | 2006064774 A1 | 6/2006 |

OTHER PUBLICATIONS

Office Action dated Nov. 14, 2022 of EP Patent Application No. 19208816.9.

* cited by examiner

ELECTRODE STRUCTURE AND METHOD OF MANUFACTURING THE SAME, AND SECONDARY BATTERY INCLUDING THE ELECTRODE STRUCTURE

CROSS-REFERENCE TO RELATED APPLICATION

This application claims priority to and the benefit of Korean Patent Application No. 10-2018-0143898, filed on Nov. 20, 2018, in the Korean Intellectual Property Office, and all the benefits accruing therefrom under 35 U.S.C. § 119, the content of which in its entirety is herein incorporated by reference.

BACKGROUND

1. Field

The present disclosure relates to an electrode structure, methods of manufacturing the electrode structure, and a secondary battery including the electrode structure.

2. Description of the Related Art

Secondary batteries are rechargeable and dischargeable, unlike a primary battery that is not rechargeable, and in particular, lithium secondary batteries may have higher voltage and higher specific energy than nickel-cadmium batteries or nickel-hydrogen batteries. Nonetheless, there remains a need for improved battery materials.

SUMMARY

Provided is an electrode structure, methods of manufacturing the electrode structure, and a secondary battery including the electrode structure.

Additional aspects will be set forth in part in the description which follows and, in part, will be apparent from the description, or may be learned by practice of the presented embodiments.

According to an aspect of an embodiment, an electrode structure includes: a base layer including a first active material; and a plurality of active material plates provided on a surface of the base layer and spaced apart from one another, the plurality of active material plates including a second active material, wherein an active material density of the base layer is less than an active material density of an active material plate of the plurality of active material plates.

The electrode structure may further include an electrode current collector layer on a second surface of the base layer, the second layer being opposite the first surface of the base layer. The electrode current collector layer may include a metal having a conductivity of about $10^3$ Siemens per meter to about $10^7$ Siemens per meter at 20° C.

The first active material and the second active material each independently may include a lithium metal oxide. The first active material and the second active material may be different in composition or the first active material may have a same composition as the second active material.

A volume fraction of the first active material may be in a range from about 50 volume percent to about 90 volume percent, based on a total volume of the base layer. A volume fraction of the second active material may be in a range from about 80 volume percent to about 100 volume percent, based on a total volume of the plurality of active material plates.

The base layer may have a height of about 5 micrometers (μm) to about 200 μm.

The base layer may include a conductive metal having a conductivity of $10^3$ to $10^7$ Siemens per meter at 20° C. and the first active material. The conductive metal may include aluminum (Al), copper (Cu), nickel (Ni), cobalt (Co), chromium (Cr), tungsten (W), molybdenum (Mo), silver (Ag), gold (Au), platinum (Pt), lead (Pd), or a combination thereof. A volume fraction of the conductive metal may be equal to or less than about 30 volume percent, based on based on a total volume of the conductive metal having a conductivity of $10^3$ to $10^7$ Siemens per meter at 20° C. and the first active material.

An active material plate of the plurality of active material plates may include a plurality of active material layers that are stacked from the base layer. An active material density of the active material plate of the plurality of active material layers may increase in a direction away from the base layer.

The plurality of active material plates may define a width direction, a length direction, and a height direction, and the plurality of active material plates may be spaced apart from one another in the width direction. A distance between adjacent active material plates may be greater than 0 μm and equal to or less than about 50 μm. The plurality of active material plates define a width direction, a length direction, and a height direction, and the plurality of active material plates may be spaced apart from one another in the length direction.

At least one of the plurality of active material plates may have a length that is different from a length of another active material plate.

A width of an active material plate of the plurality of active material plates may be equal to or greater than about 10 μm. A height of an active material plate of the plurality of active material plates is greater than a width of an active material plate of the plurality of active material plates. A height of an active material plate of the plurality of active material plates may be in a range from about 20 μm to about 1,000 μm.

A channel between active material plates of the plurality of active material plates may extend to a surface of the base layer or extend to a predetermined depth in the base layer.

An angle between a direction perpendicular to a surface of an active material plate of the plurality of active material plates and an oriented direction of a crystal grain in the active material plate may be about 1° to about 45°. The oriented crystal direction of the crystal grain may be a <100>, <010>, <110>, <101>, <012>, <104>, <113>, or <021> direction.

According to an aspect of an embodiment, a method of manufacturing an electrode structure, the method includes: fabricating a first active material film including a first active material and a second active material film including a second active material, wherein the second active material film is provided on a surface of the first active material film; forming a plurality of channels in the second active material film to a predetermined depth; and sintering the first active material film and the second active material film to form a base layer and a plurality of active material plates on a first surface of the base layer, to manufacture the electrode structure, wherein an active material density of the first active material film is less that an active material density of the second active material film.

The method may further include forming an electrode current collector layer on a second surface of the base layer, the second layer being opposite the first surface of the base layer.

Forming of the plurality of channels may include blade stamping process. The plurality of channels formed by the blade stamping process may provide a channel extending to the first active material film or extending to a predetermined depth in the first active material film.

The sintering may include removing a binder from first active material film and the second active material film.

According to an aspect of an embodiment, a secondary battery includes: a first electrode structure and a second electrode structure spaced apart from each other; and a separation film between the first electrode structure and the second electrode structure, wherein the first electrode structure includes: a base layer including a first active material; and a plurality of active material plates provided on a first surface of the base layer and spaced apart from one another, the plurality of active material plates including a second active material, wherein an active material density of the base layer is less than an active material density of an active material plate of the plurality of active material plates.

The first electrode structure and the second electrode structure may be respectively a cathode structure and an anode structure.

The first electrode structure further may include an electrode current collector layer on a second surface of the base layer, the second layer being opposite the first surface of the base layer.

An electrolyte may be disposed in a channel between active material plates of the plurality of active material plates. The channels may extend to the surface of the base layer or to extend to a predetermined depth in the base layer.

The base layer may include a conductive metal having a conductivity of about $10^3$ Siemens per meter to about $10^7$ Siemens per meter at 20° C. and the first active material.

An active material plate of the plurality of active material plates may include a plurality of active material layers that are stacked from the base layer. An active material density of the active material layer of plurality of active material layers may increase in a direction away from the base layer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
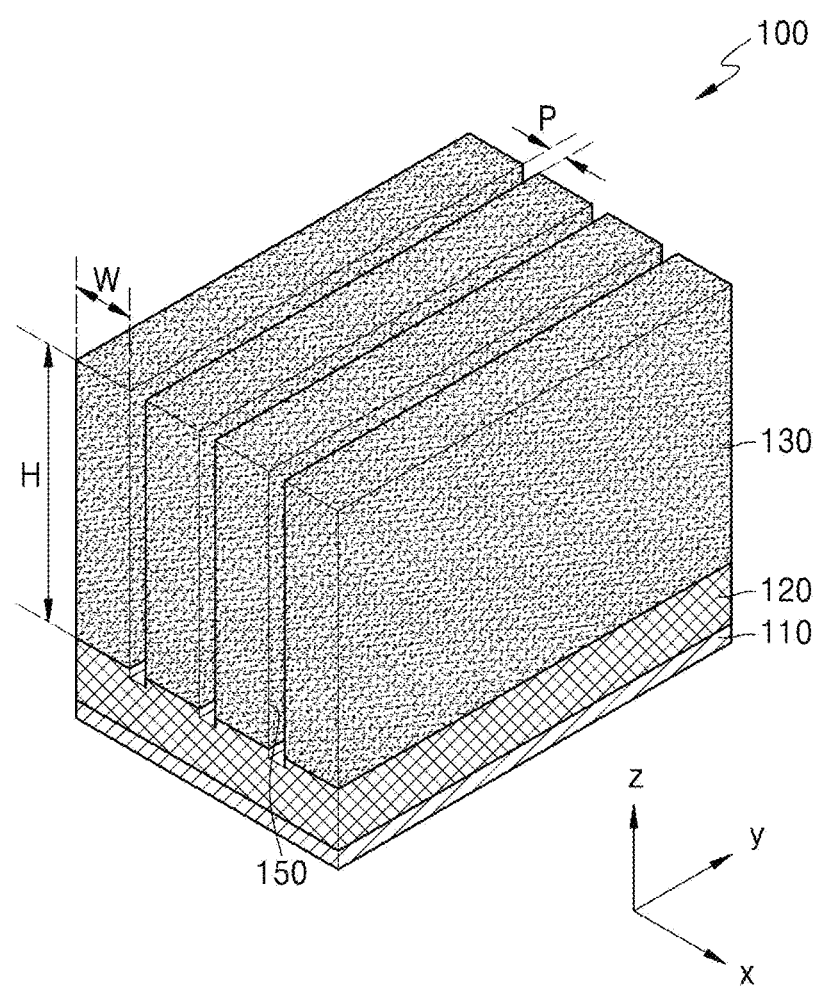
FIG. 1 is a perspective view of an embodiment of an electrode structure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, one or more embodiments of the present disclosure will be described in detail with reference to accompanying drawings. In the drawings, like reference numerals denote like components, and sizes of components in the drawings may be exaggerated for convenience of explanation. The embodiments of the disclosure are capable of various modifications and may be embodied in many different forms.

When a layer, a film, a region, or a panel is referred to as being "on" another element, it may be directly on the other layer or substrate, or intervening layers may also be present. An expression used in the singular encompasses the expression of the plural, unless it has a clearly different meaning in the context. Throughout the specification, when a portion "includes" an element, another element may be further included, rather than excluding the existence of the other element, unless otherwise described.

As used herein, in particular, terms such as "the" and demonstratives similar thereto used herein may be to indicate both the singular and the plural. Also, the steps of all methods described herein may be performed in any suitable order unless otherwise indicated herein or otherwise clearly contradicted by context. The present disclosure is not limited to the described order of the steps. The use of any and all examples, or example language provided herein, is intended merely to better illuminate the present disclosure and does not pose a limitation on the scope of the present disclosure unless otherwise claimed.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A high-capacity secondary battery may include an electrode having a three-dimensional structure.

Figure 2:
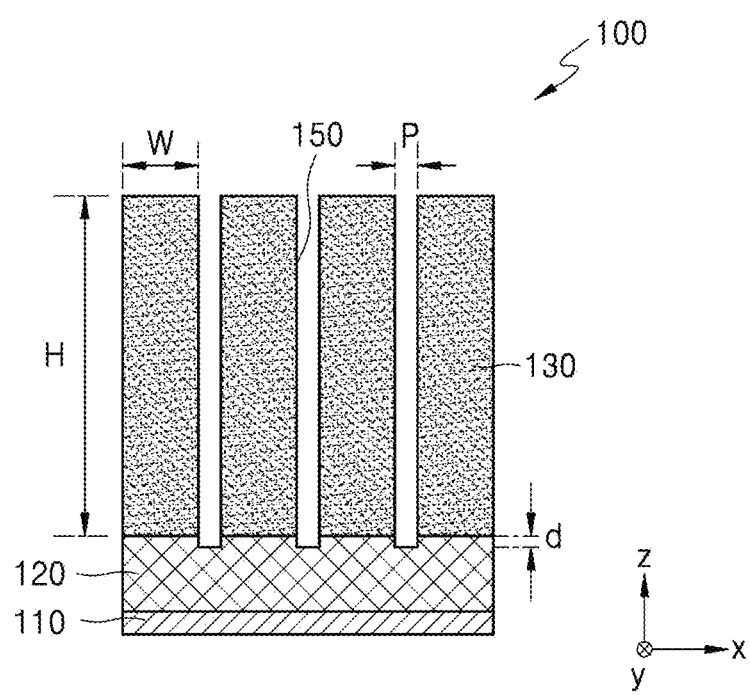
FIG. 2 is a cross-sectional view of the electrode structure of FIG. 1.

FIG. 1 is a perspective view of an electrode structure 100 according to an embodiment. FIG. 2 is a cross-sectional view of the electrode structure 100 of FIG. 1.

Referring to FIG. 1 and FIG. 2, the electrode structure 100 includes an electrode current collector layer 110, a base layer 120 on the electrode current collector layer 110, and a plurality of active material plates 130 provided on the base layer 120. The electrode structure 100 may be, for example, a cathode structure of a lithium secondary battery. The electrode structure 100 according to an embodiment may have a three-dimensional structure. The electrode structure 100 (in particular, the base layer 120 and the plurality of active material plates 130) may define a width direction, a length direction, and a height direction, and in FIG. 1, the width direction, the length direction, and the height direction are respectively indicated as an x-axis direction, a y-axis direction, and a z-axis direction.

The electrode current collector layer 110 may include, for example, a cathode current collector layer. The electrode current collector layer 110 may include conductive metal, e.g., a metal having a conductivity of about $10^3$ Siemens per meter to about $10^7$ Siemens per meter at 20° C. For example, the electrode current collector layer 110 may include, for example, but is not limited to, copper (Cu), gold (Au), platinum (Pt), silver (Ag), zinc (Zn), aluminum (Al), magnesium (Mg), titanium (Ti), iron (Fe), cobalt (Co), nickel (Ni), germanium (Ge), indium (In), palladium (Pd), or a combination thereof.

The base layer 120 may be provided on an upper surface of the electrode current collector layer 110. The base layer 120 may include a first active material. In addition, the plurality of active material plates 130 may be provided on an upper surface of the base layer 120, to be spaced apart from one another with a predetermined distance P. An active material plate 130, e.g., each of the active material plates 130, may include a second active material.

The first and second active materials may include, for example, a cathode active material. Here, the first and second active materials may be the same as or different from each other. The first and second active materials may include, for example, a lithium metal oxide, lithium metal phosphate, or a combination thereof, such as $LiCoO_2$ (LCO), $Li[Ni,Co,Mn]O_2$ (NCM), $Li[Ni,Co,Al]O_2$ (NCA), $LiMn_2O_4$ (LMO), $LiFePO_4$ (LFP), or a combination thereof. However, embodiments are not limited thereto. $Li[Ni,Co,Mn]O_2$ may be $LiNi_{1-x-y}Co_xMn_yO_2$ wherein $0<x<1$, $0<y<1$, and $0<z<1$. $Li[Ni,Co,Al]O_2$ may be $LiNi_{1-x-y}Co_xAl_yO_2$ wherein $0<x<1$, $0<y<1$, and $0<z<1$.

The base layer 120 may have an active material density that is less than an active material density of the active material plates 130. For example, a volume fraction of the first active material in the base layer 120 may be about 50 volume percent (vol %) to about 90 vol %, about 55 vol % to about 85 vol %, or about 60 vol % to about 80 vol %, based on a total volume of the base layer. However, embodiments are not limited thereto. The base layer 120 may have a height, for example, of about 5 micrometers (μm) to about 200 μm, about 10 μm to about 180 μm, or about 10 μm to about 180 μm. However, embodiments are not limited thereto.

Since the base layer 120 may be manufactured through a sintering process as described later, the base layer 120 may not include a binder and a conductive material. As described above, when the base layer 120 includes a porous material having a low active material density, pores in the base layer 120 may be filled with an electrolyte of a secondary battery as described later.

The base layer 120 may include the first active material and the conductive metal, e.g., a complex of the first active material and the conductive metal. Here, the conductive metal may include, but is not limited to, Al, Cu, Ni, Cr, W, Mo, Ag, Au, Pt, Pd, or a combination thereof. The volume fraction of the first active material in the first active material and the conductive metal, e.g., the complex of the first active material and the conductive metal, may be equal to or less than about 30 vol %, based on a total volume of the first active material and the conductive metal, e.g., a total volume of the complex of the first active material and the conductive metal, but is not limited thereto.

The active material plate 130 may have an active material density that is greater than an active material density of the base layer 120. For example, a volume fraction of the second active material in the active material plate 130 may be about 80 vol % to about 100 vol %, based on a total volume of the active material plate 130. However, embodiments are not limited thereto. Since the active material plate 130 may be manufactured through a sintering process as described later, the active material plate 130 may not include a binder and a conductive material.

The plurality of active material plates 130 are provided on the upper surface of the base layer 120 to be spaced apart from one another, thereby forming the electrode structure 100 in the three-dimensional structure. The plurality of active material plates 130 may be spaced apart from one another with a predetermined distance P in the width direction (x-axis direction) on the upper surface of the base layer 120. For example, the plurality of active material plates 130 may be spaced apart from one another with the distance P that is greater than 0 and equal to or less than 50 μm in the width direction. However, embodiments are not limited to the above example. The plurality of active material plates 130 may be arranged substantially perpendicular to the upper surface of the base layer 120, but are not limited thereto.

An active material plate 130 of the plurality of active material plates 130, e.g., each of the plurality of active material plates 130, may have an aspect ratio greater than 1:1. That is, the active material plate 130 may have a height H that is greater than a width W. For example, the width W of the active material plate 130 may be about 10 μm or greater, and the height H of the active material plate 130 may be about 20 μm to about 1,000 μm. However, embodiments are not limited thereto, and the width W and the height H of the active material plate 130 may vary. The plurality of active material plates 130 may have the same lengths as one another. However, embodiments are not limited thereto, that is, at least one of the plurality of active material plates 130 may have a length that is different from a length of another active material plate 130.

As described above, since the plurality of active material plates 130 are spaced apart from one another with the predetermined distance P on the upper surface of the base layer 120, channels 150 may be formed among the active material plates 130. Here, the channel 150 may have a constant, e.g., uniform, width corresponding to the distance P between the active material plates 130. The channel 150 may extend to a predetermined depth d in the base layer 120 between the plurality of active material plates 130. The depth d of the channel 150 in the base layer 120 may vary. As described later, the channel 150 may be formed to reach, e.g., extend to, the upper surface of the base layer 120.

The channel 150 between the plurality of active material plates 130 may be filled with the electrolyte of the secondary battery. Therefore, the channel 150 and the pores in the base layer 120 connected to the channel 150 may be filled with the electrolyte.

Figure 3:
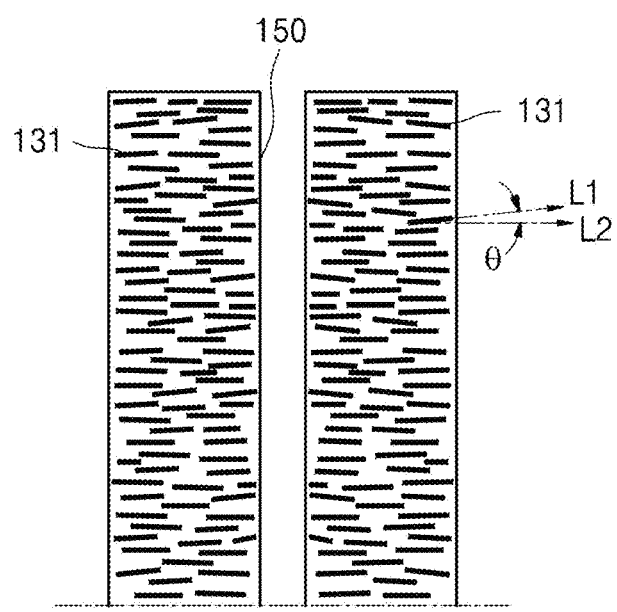
FIG. 3 is an enlarged view of the inside of an active material plate of FIG. 2.

FIG. 3 is an enlarged internal portion of the active material plate 130 of FIG. 2.

Referring to FIG. 3, in an the active material plate 130, e.g., in each of the active material plates 130, one or more crystal grains 131 of the second active material may be oriented in a predetermined direction. Here, the one or more crystal grains 131 may be oriented in a direction, in which lithium ions in the active material plate 130 may move towards the electrolyte filled in the channel 150, in order to improve ion conductivity. An angle Θ between a direction in which a crystal grain 131 is oriented in the active material plate 130 (orientated direction, L1) and a direction perpendicular to a surface of an active material plate 130 of the plurality of active material plates 130 (L2) may be about 1° to about 45°. In this case, the oriented crystal direction of the crystal grain 131 may be a <100>, <010>, <110>, <101>, <012>, <104>, <113>, or <021> direction. Here, a <100>, <010>, <110>, <101>, <012>, <104>, <113>, or <021> direction is a Miller index used in crystallography, and indicates a direction of a crystal lattice.

In the electrode structure 100 according to an embodiment, the base layer 120 and the active material plates 130 of the electrode are manufactured through the sintering process as described later, and thus, the base layer 120 and the active material plates 130 may not include a binder for binding the active materials and a conductive material for improving electric conductivity that may be decreased due to inclusion of a binder. Also, since the three-dimensional structure is formed by providing the active material plates 130 to be spaced apart from one another on the base layer 120 in order to guide the movement of the lithium ions via the electrolyte having an excellent ion conductivity, the ion conductivity may be improved. When the ion conductivity is improved, the heights of the active material plates 130 may increase, and accordingly, current density may be improved.

Since the active material density in the base layer 120 is less than the active material density in the active material plates 130, the movement of lithium ions may be efficiently guided towards the electrode current collector layer 110 via the electrolyte in the base layer 120, and thus, the ion conductivity may be improved. Also, a crystal grain is, e.g., a plurality or all of the crystal grains 131 are, oriented in the direction in which the lithium ions in the active material plate 130 may move towards the electrolyte filled in the channel 150, and the ion conductivity may be further improved. By applying the electrode structure 100 having the three-dimensional structure, a secondary battery having high energy density may be implemented.

FIGS. 4A to 4G are diagrams illustrating a method of manufacturing an electrode structure, according to an embodiment.

Figure 4A:
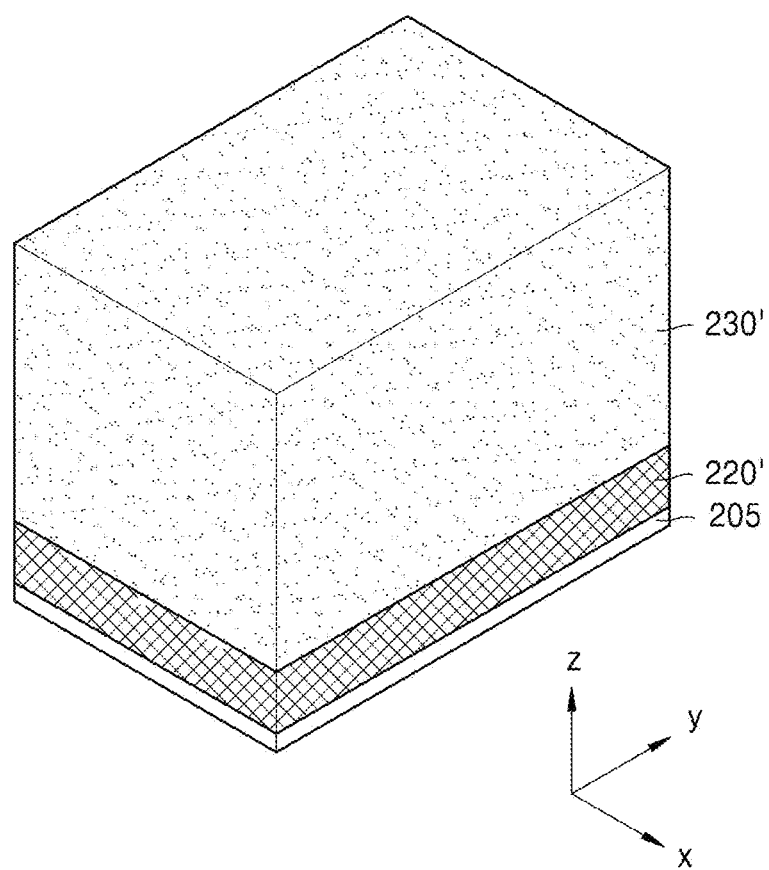
FIGS. 4A to 4G are diagrams illustrating an embodiment of a method of manufacturing an electrode structure.

Referring to FIG. 4A, a low-density active material film 220' and a high-density active material film 230' are sequentially formed on a substrate 205. The substrate 205 may include a flexible substrate, for example, a polyethylene terephthalate (PET) substrate, but is not limited thereto. The low-density active material film 220' and the high-density active material film 230' may be formed by a tape casting method.

Figure 4B:
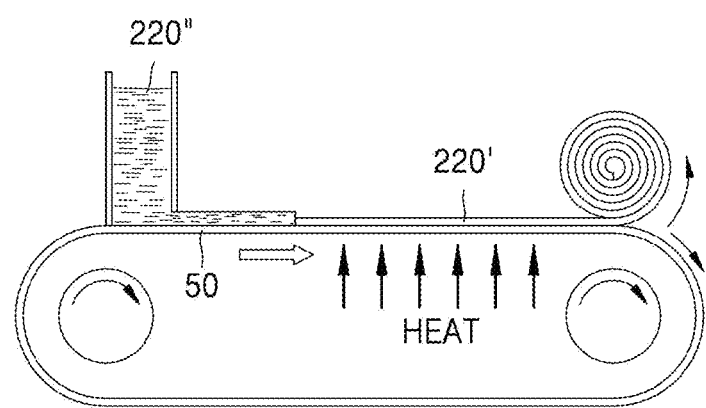

FIG. 4B shows an example of forming the low-density active material film 220' by a tape casting method.

Referring to FIG. 4B, a low-density active material slurry 220" is prepared by mixing, for example, a low-density active material powder, a dispersing agent, a binder, a plasticizer, and a solvent. In addition, the low-density active material slurry 220" is applied to a conveyor belt 50 that is moving. Here, the low-density active material slurry 220"

may be applied to a constant, e.g., uniform, thickness by using, for example, a doctor blade. Next, the low-density active material slurry 220" is heated to be dried, thereby forming the low-density active material film 220'. In the low-density active material film 220', particles of the low-density active material powder are combined with one another by the binder. The low-density active material powder may include the first active material, that is, the cathode active material, for forming a base layer that will be described later (220 of FIG. 4G).

In addition, the high-density active material film 230' may be formed in the same manner as that of the low-density active material film 220'. In the high-density active material film 230', particles of the high-density active material powder are combined with one another by the binder. The high-density active material powder may include the second active material, that is, the cathode active material, for forming a plurality of active material plates that will be described later (230 of FIG. 4G).

Here, the first and second active materials may be the same as or different from each other. The first and second active materials may include, for example, $LiCoO_2$ (LCO), $Li[Ni,Co,Mn]O_2$ (NCM), $Li[Ni,Co,Al]O_2$ (NCA), $LiMn_2O_4$ (LMO), $LiFePO_4$ (LFP), or a combination thereof. However, embodiments are not limited thereto.

The low-density active material film 220' and the high-density active material film 230' shown in FIG. 4A may be obtained by forming the low-density active material film 220' on the upper surface of the substrate 205 and forming the high-density active material film 230' on an upper surface of the low-density active material film 220'. The low-density active material film 220' and the high-density active material film 230' may be separately formed, and the low-density active material film 220' and the high-density active material film 230' may be sequentially laminated on the substrate 205. Here, a ratio between a thickness of the low-density active material film 220' and a thickness of the high-density active material film 230' may be, for example, about 1:4, but is not limited thereto.

Figure 4C:
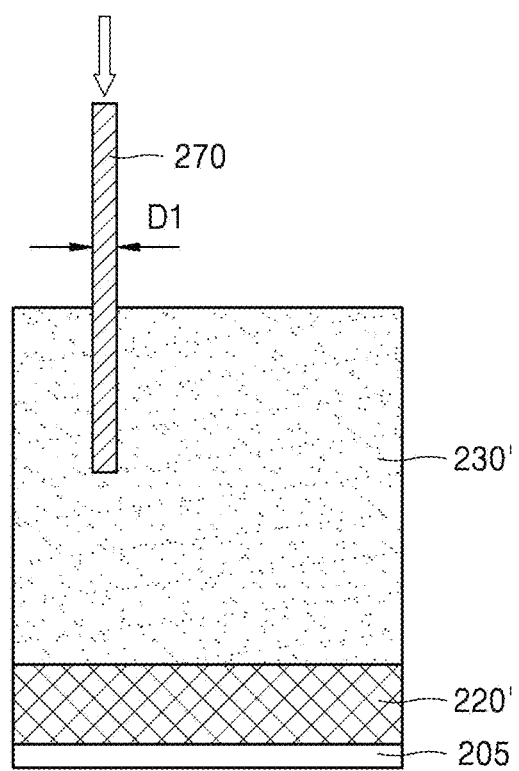
Figure 4D:
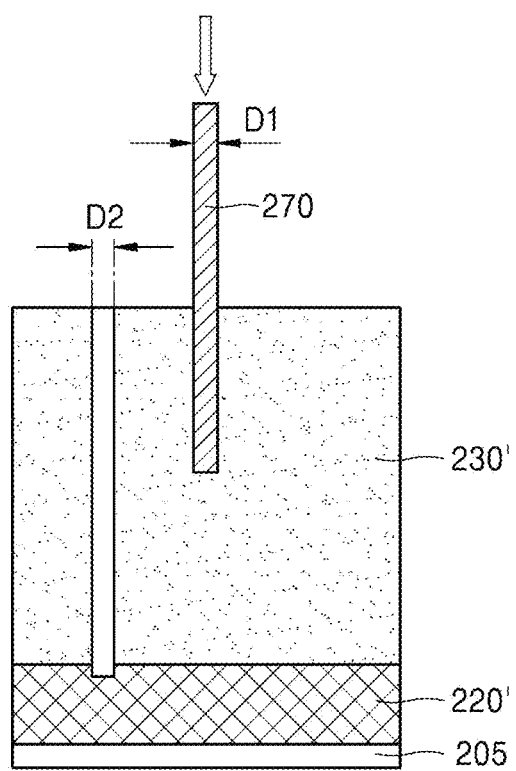
Figure 4E:
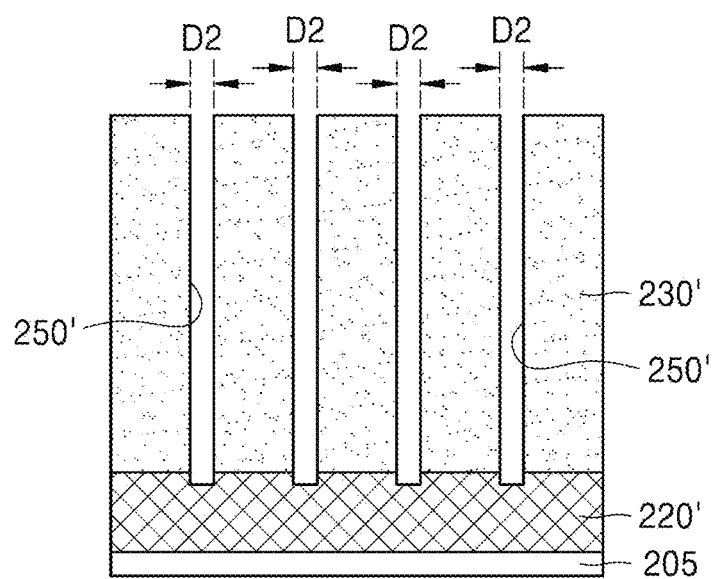

Next, referring to FIGS. 4C to 4E, a plurality of channels are formed in the high-density active material film 230' through a blade stamping process. In particular, as shown in FIG. 4C, a blade 270 having a predetermined width D1 is forced to be inserted to the high-density active material film 230'. Here, the blade 270 may be inserted in the low-density active material film 220' to a predetermined depth. The blade 270 may be inserted to reach, e.g., extend to, the upper surface of the low-density active material film 220'.

In addition, when the blade 270 inserted in the high-density active material film 230' is pulled out, a channel 250' may be formed in the high-density active material film 230'. In this case, the channel 250' may have a width D2 that is less than the width D1 of the blade 270, due to elastic restoring force of the high-density active material film 230'.

When the above blade stamping process is repeatedly performed on the high-density active material film 230' with constant, e.g., uniform, intervals, as shown in FIG. 4E, the channels 250' each having the predetermined width D2 may be formed in the high-density active material film 230' with constant, e.g., uniform, intervals. Here, the channels 250' may extend to a predetermined depth of the low-density active material film 220'. The channels 250' may be formed to reach, e.g., extend to, the upper surface of the low-density active material film 220'.

Figure 4F:
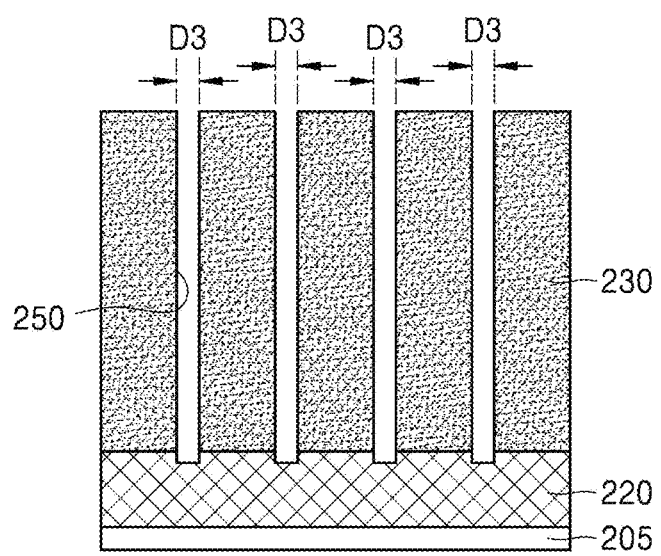

Next, referring to FIG. 4F, after the blade stamping process, a sintering process is performed on the low-density active material film 220' and the high-density active material film 230' to form a base layer 220 and a plurality of active material plates 230. The sintering process may be performed by thermally treating the low-density active material film 220' and the high-density active material film 230' at a predetermined temperature for a predetermined time period. Through the sintering process, the binder included in the low-density active material film 220' and the high-density active material film 230' may be removed. Accordingly, the base layer 220 including the first active material that is the low-density active material may be obtained by removing the binder from the low-density active material film 220', and the plurality of active material plates 230 including the second active material that is the high-density active material may be obtained to be spaced apart from one another on an upper surface of the base layer 220 by removing the binder from the high-density active material film 230'.

The low-density active material film 220' and the high-density active material film 230' may contract due to the sintering process, and accordingly, a width D3 of a channel 250 formed among the plurality of active material plates 230, e.g., each channel 250 formed among the plurality of active material plates 230, may be less than the width D2 of the channel 250' formed through the blade stamping process. Here, the channels 250 among the plurality of active material plates 230 may extend to a predetermined depth in the base layer 220. The channels 250 may be formed to reach, e.g., extend to, the upper surface of the base layer 220. Through the sintering process, the base layer 220 having the low active material density and the plurality of active material plates 230 having the high active material density may be obtained, and a desired average active material density of the electrode may be obtained.

Figure 4G:
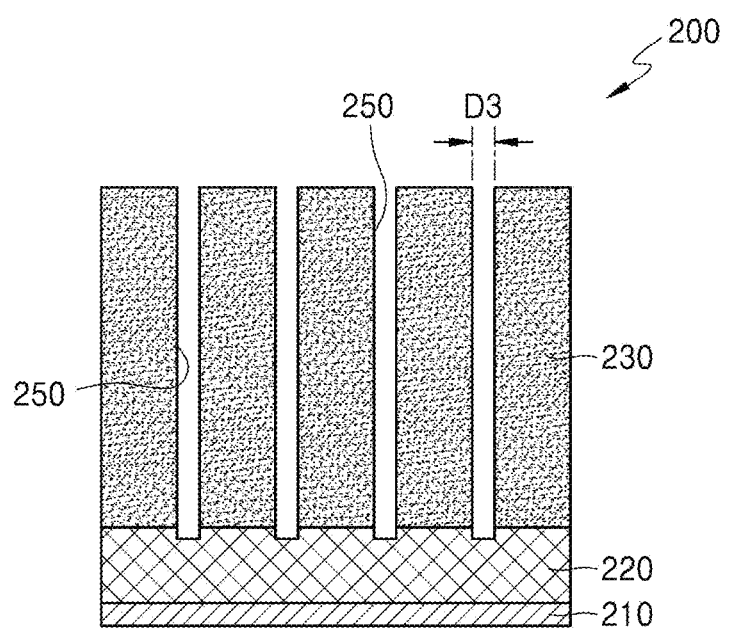

Referring to FIG. 4G, an electrode current collector layer 210 is formed on a lower surface of the base layer 220. The electrode current collector layer 210 may be formed by removing a substrate 205 attached to the lower surface of the base layer 220, and depositing a current collecting material such as Al, Ni, or a combination thereof on the lower surface of the base layer 220 by, for example, a sputtering method.

Figure 5:
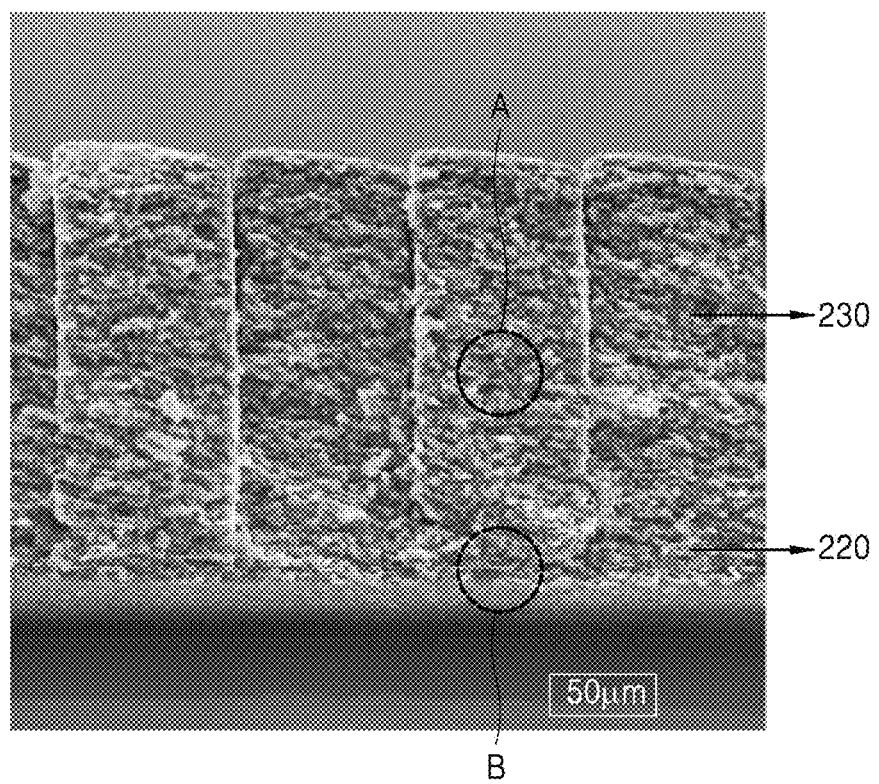
FIG. 5 is a scanning electron microscope (SEM) image of a base layer and a plurality of active material plates manufactured through processes of FIGS. 4A to 4G.

FIG. 5 is a scanning electron microscope (SEM) image of the base layer 220 and the plurality of active material plates 230 manufactured through processes of FIGS. 4A to 4G. In FIG. 5, region A indicates a part of the active material plate 230, e.g., including high-density LCO, and region B indicates a part of the base layer 220, e.g., including low-density LCO. Here, the base layer 220 and the plurality of active material plates 230 use LCO as the active material. Referring to FIG. 5, a thickness of a cathode (e.g., the sum of a height of the base layer and a height of the active material plate) is measured to be about 125 μm. Here, a ratio between the height of the base layer 220 and the height of the active material plate 230 is about 1:4. In addition, an interval between the active material plates 230 (e.g., the width of the channel) is measured to be about 1 μm.

Figure 6A:
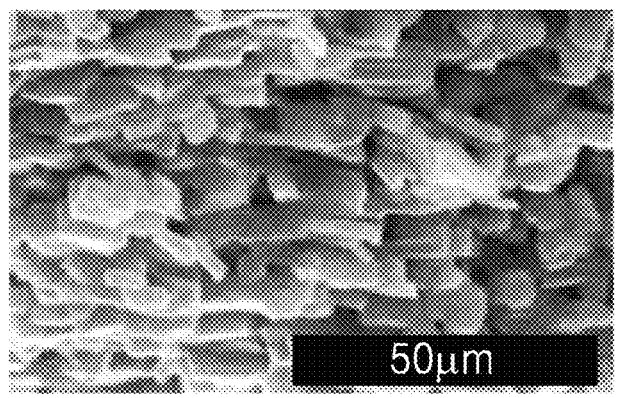
FIGS. 6A and 6B are SEM images of a region A and a region B in FIG. 5.
Figure 6B:
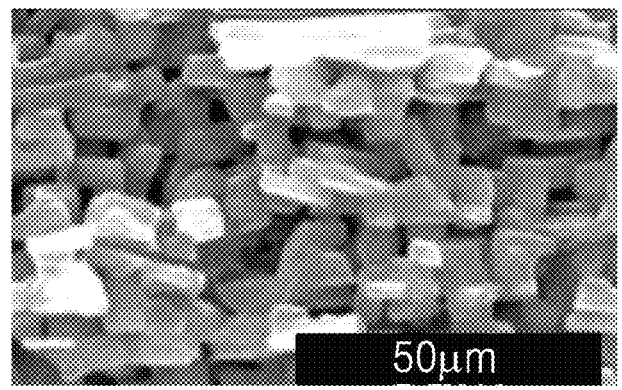

FIGS. 6A and 6B are SEM images of the region A and the region B in FIG. 5. FIG. 6A shows an active material plate including high-density LCO. Here, a volume fraction of the LCO in the active material plate is measured to be about 92.3 vol %, based on a total volume of the active material plate. FIG. 6B shows a base layer including low-density LCO. Here, a volume fraction of the LCO in the base layer is measured to be about 85 vol %, based on a total volume of the base layer.

Figure 7:
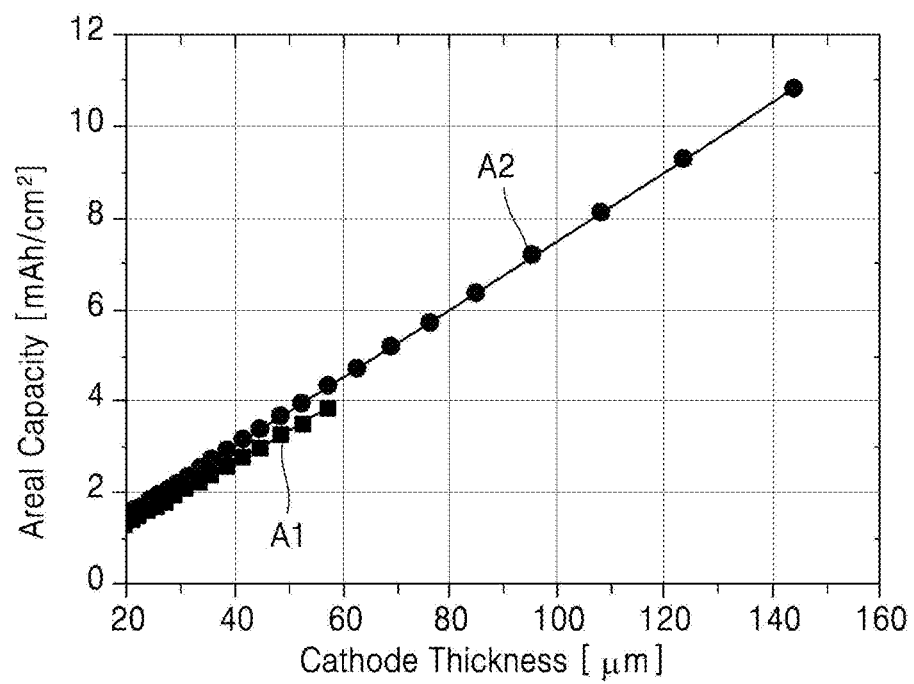
FIG. 7 is a graph of areal capacity (milliampere hours per square centimeter ($mAh/cm^2$)) versus cathode thickness (micrometers ($\mu m$)) showing a simulation result in which an electrode structure according to an embodiment is compared with a comparative electrode structure.

FIG. 7 is a graph showing a simulation result in which an areal capacity according to a thickness of an electrode (cathode) in an electrode structure according to an embodiment is compared with that of a comparative electrode structure. In FIG. 7, A1 denotes a comparative electrode structure and A2 denotes an electrode structure according to an embodiment.

The comparative electrode structure is a two-dimensional electrode structure and uses an active material layer including LCO as a cathode. In addition, the electrode structure according to an embodiment is a three-dimensional electrode structure and includes a cathode, in which a base layer including low-density LCO and a plurality of active material plates including high-density LCO and spaced apart from one another on the base layer are provided. Here, the volume fraction of the LCO in the base layer is about 85 vol %, based on a total volume of the base layer, and the volume fraction of the LCO in the active material plate is about 92.3 vol %, based on a total volume of the active material plate.

Referring to FIG. 7, in the comparative electrode structure, the cathode may have a thickness up to 50 μm. The ion conductivity in the cathode may decrease when the thickness of the cathode is equal to or greater than a predetermined level. In the comparative electrode structure, when the maximum thickness of the cathode is about 50 μm, a capacity per area is about 3.8 mAh/cm$^2$. In addition, in the electrode structure according to an embodiment, the capacity per area may be improved as the thickness of the cathode increases. In the electrode structure according to an embodiment, when the thickness of the cathode is about 124 μm, the capacity per area is about 9.3 mAh/cm$^2$. As described above, when the electrode structure is manufactured to have a three-dimensional structure according to an embodiment, the capacity per area may be improved.

Figure 8:
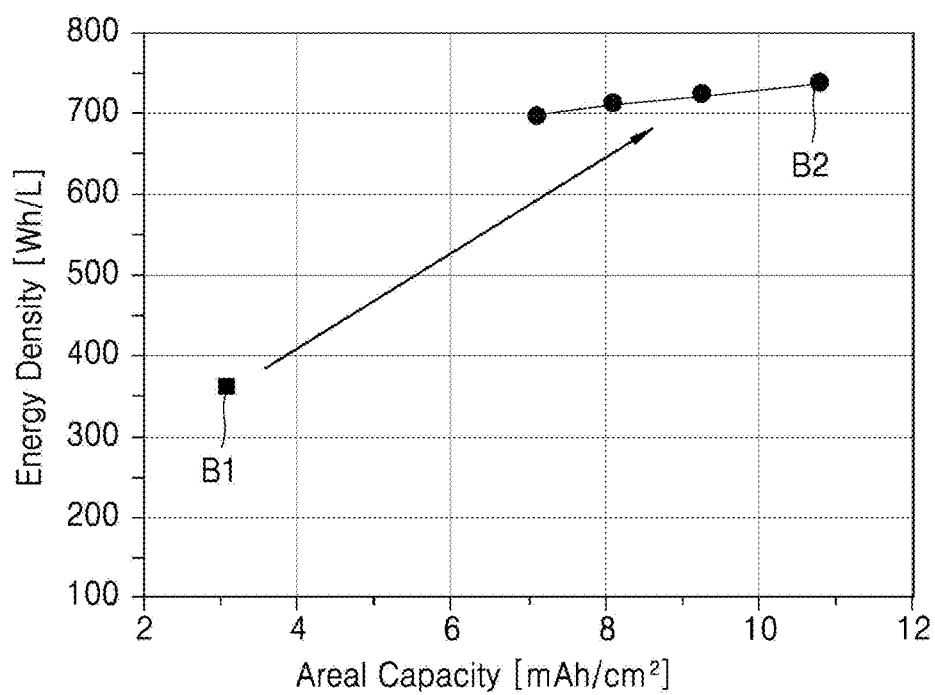
FIG. 8 is a graph of energy density (watt hours per liter (Wh/L)) versus areal capacity ($mAh/cm^2$) showing a simulation result in which a secondary battery according to an embodiment is compared with a secondary battery including the comparative electrode structure.

FIG. 8 is a graph showing a simulation result, in which the energy density of a secondary battery according to an embodiment is compared with that of a secondary battery including the comparative electrode structure. In FIG. 8, B1 denotes a comparative secondary battery and B2 denotes a secondary battery including the electrode structure according to an embodiment. Here, the secondary battery has a disc shape having a diameter of 14.1 millimeters (mm) and a thickness of 5.4 mm.

The comparative secondary battery is a lithium ion battery. In addition, in the secondary battery to which the electrode structure according to an embodiment is applied, the cathode includes the base layer (the volume fraction of the LCO is about 85 vol %, based on a total volume of the base layer) including the low density LCO and the plurality of active material plates (the volume fraction of the LCO is about 92.3 vol %, based on a total volume of the active material plates) including the high density LCO and spaced apart from one another on the base layer, and an anode includes Si—C complex.

Referring to FIG. 8, the energy density of the secondary battery including the electrode structure according to an embodiment is about two times greater than the energy density of the comparative secondary battery.

Figure 9A:
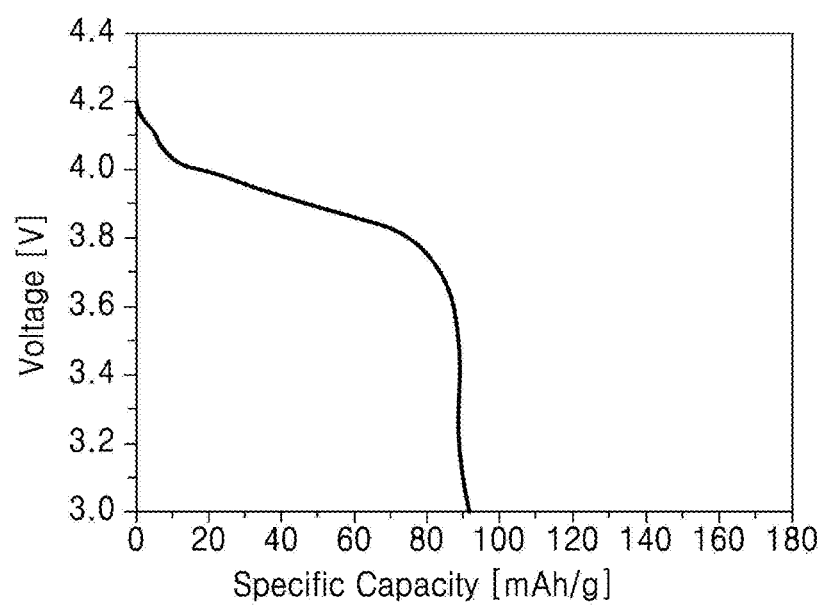
FIGS. 9A and 9B are graphs of voltage (volts (V)) versus specific capacity (milliampere hours per gram (mAh/g)) respectively showing specific capacities of a half cell in a secondary battery including a comparative electrode structure and a half cell of a secondary battery including an electrode structure according to an embodiment.
Figure 9B:
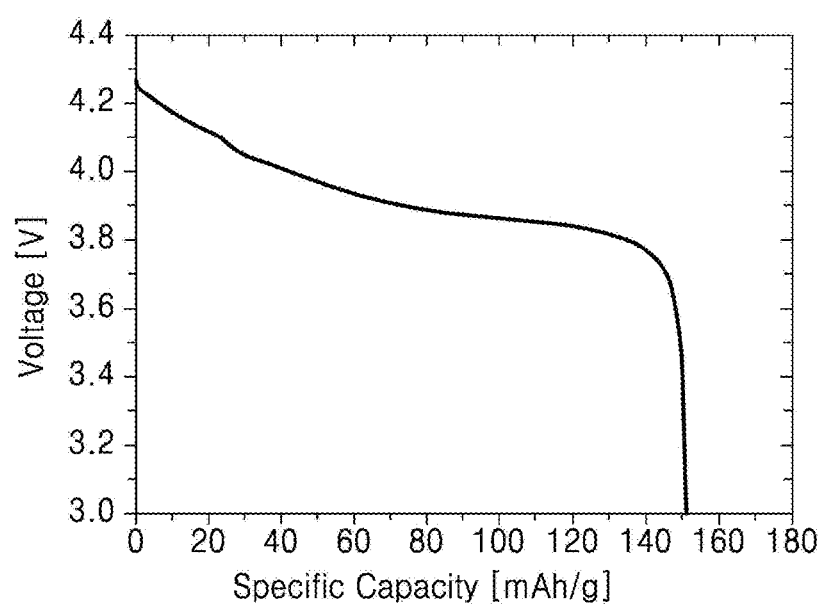

FIG. 9A shows a specific capacity of a half-cell in a secondary battery in which the comparative electrode structure is provided, and FIG. 9B shows a specific capacity of a half-cell in a secondary battery in which the electrode structure according to an embodiment is provided. Here, an anode of the secondary battery includes lithium metal.

The comparative electrode structure is a two-dimensional electrode structure and a cathode thereof includes an active material layer including LCO and having a thickness of about 120 μm, wherein the cathode is manufactured through a sintering process. Here, the active material layer does not include a binder. In addition, the electrode structure according to an embodiment is a three-dimensional electrode structure, and the cathode thereof includes the base layer (the volume fraction of the LCO is about 85 vol %, based on a total volume of the base layer) including the low density LCO and the plurality of active material plates (the volume fraction of the LCO is about 92.3 vol %, based on a total volume of the active material plate) including the high density LCO and spaced apart from one another on the base layer.

Referring to FIGS. 9A and 9B, the half-cell specific capacity in the comparative electrode structure is measured to be about 91 mAh/g, and the half-cell specific capacity in the electrode structure according to an embodiment is measured to be about 151 mAh/g. Therefore, the half-cell specific capacity of the electrode structure according to an embodiment is improved about 1.6 times greater than the half-cell specific capacity of the comparative electrode structure.

Figure 10:
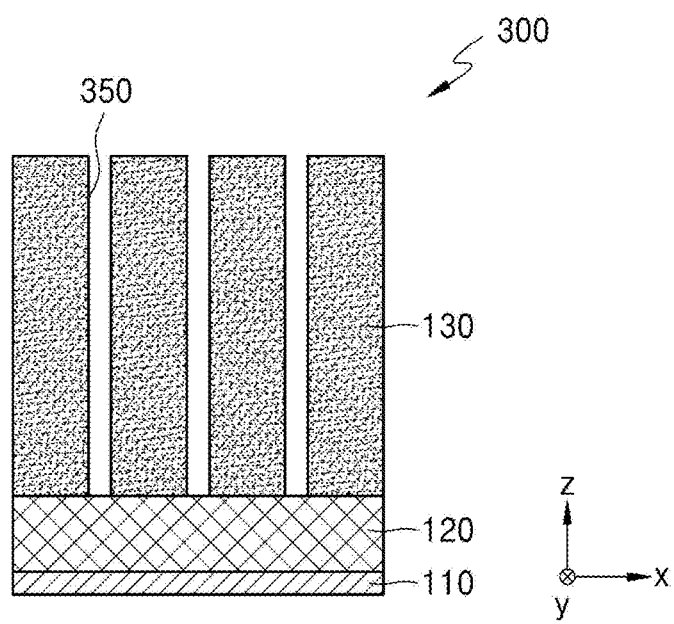
FIG. 10 is a cross-sectional view of an embodiment of an electrode structure.

FIG. 10 is a cross-sectional view of an electrode structure 300 according to an embodiment. The electrode structure 300 of FIG. 10 is the same as the electrode structure 100 of FIG. 1, except for a depth of a channel 350.

Referring to FIG. 10, the base layer 120 is provided on the upper surface of the electrode current collector layer 110, and the plurality of active material plates 130 are spaced apart from one another on the upper surface of the base layer 120. Accordingly, channels 350 filled with an electrolyte may be formed among the plurality of active material plates 130. Here, the channel 350 may have a constant, e.g., uniform, width corresponding to the distance between the active material plates 130. The channels 350 may be formed to reach, e.g., extend to, the upper surface of the base layer 120.

Figure 11:
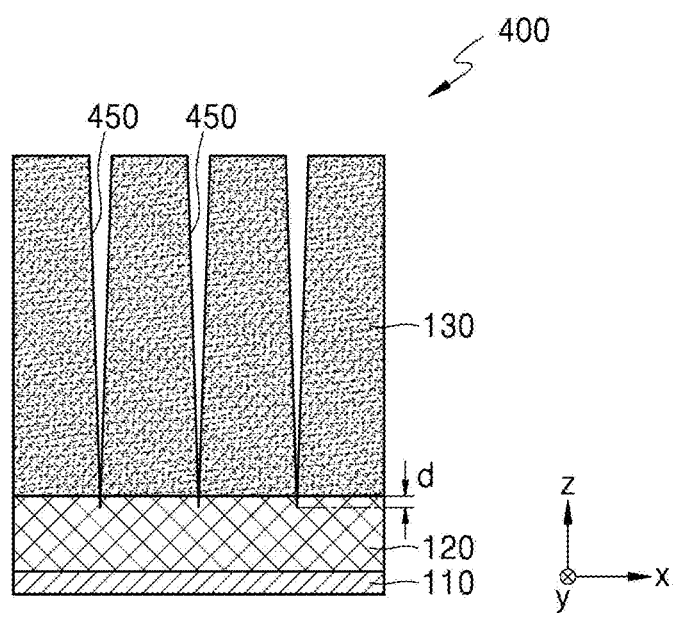
FIG. 11 is a cross-sectional view of an embodiment of an electrode structure.

FIG. 11 is a cross-sectional view of an electrode structure 400 according to an embodiment. The electrode structure 400 of FIG. 11 is the same as the electrode structure 100 of FIG. 1, except for a shape of a channel 450.

Referring to FIG. 11, the base layer 120 is provided on the upper surface of the electrode current collector layer 110, and the plurality of active material plates 130 are spaced apart from one another on the upper surface of the base layer 120. Accordingly, channels 450 filled with an electrolyte may be formed among the plurality of active material plates 130. Here, a channel 450, e.g., each of the channels 450, may be formed to have a width that is reduced towards the base layer 120, e.g., a width that decreases in a direction towards the base layer 120. The channels 450 may be formed extending to a predetermined depth d in the base layer 120.

Figure 12:
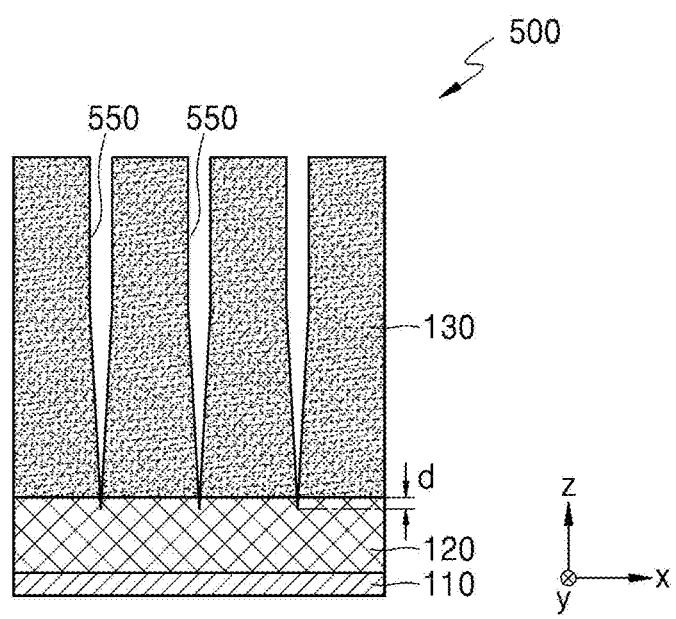
FIG. 12 is a cross-sectional view of an embodiment of an electrode structure.

FIG. 12 is a cross-sectional view of an electrode structure 500 according to an embodiment. The electrode structure 500 of FIG. 12 is the same as the electrode structure 100 of FIG. 1, except for a shape of a channel 550.

Referring to FIG. 12, the base layer 120 is provided on the upper surface of the electrode current collector layer 110, and the plurality of active material plates 130 are spaced apart from one another on the upper surface of the base layer 120. Accordingly, channels 550 filled with an electrolyte may be formed among the plurality of active material plates 130. Here, an upper portion of a channel 550, e.g., each channel 550, has a constant, e.g., uniform, width and a lower portion of a channel 550, e.g., each channel 550, may have a width that is gradually reduced towards the base layer 120, e.g., a width that gradually decreases in a direction towards the base layer 120. The channels 550 may be formed extending to a predetermined depth d in the base layer 120.

Figure 13:
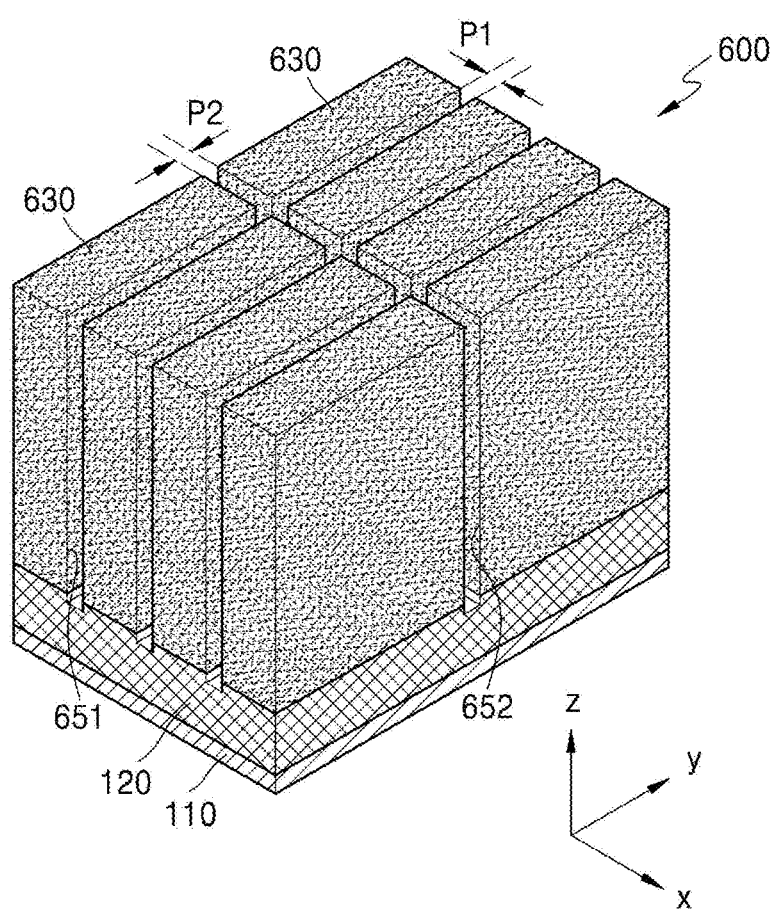
FIG. 13 is a perspective view of an embodiment of an electrode structure.

FIG. 13 is a perspective view of an electrode structure 600 according to an embodiment. The electrode structure 600 of FIG. 13 is the same as the electrode structure 100 of FIG. 1, except that a plurality of active material plates 630 are also spaced in a length direction (y-axis direction).

Referring to FIG. 13, the base layer 120 is provided on the upper surface of the electrode current collector layer 110, and a plurality of active material plates 630 are spaced apart from one another on the upper surface of the base layer 120. Here, the plurality of active material plates 630 are arranged to be spaced in the width direction (x-axis direction) with a first distance P1 and in the length direction (y-axis direction) with a second distance P2 therebetween.

First channels 651 may be formed among the active material plates 630 spaced in the width direction and a second channel 652 may be formed between the active material plates 630 spaced in the length direction. Here, widths of the first and second channels 651 and 652 may be, but are not limited to, greater than 0 μm and equal to or less than 50 μm. In addition, the shapes of the first and second channels 651 and 652 may vary. The plurality of active material plates 630 may have the same lengths as one another. However, embodiments are not limited thereto, that is, at least one of the plurality of active material plates 630 may have a length that is different from a length of another active material plate 630.

Figure 14:
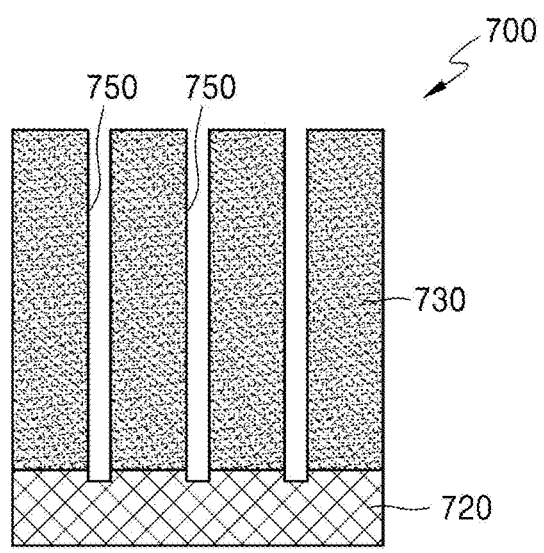
FIG. 14 is a cross-sectional view of an embodiment of an electrode structure.

FIG. 14 is a cross-sectional view of an electrode structure 700 according to an embodiment. Hereinafter, the differences of the electrode structure 700 from the above-described embodiments will be described.

Referring to FIG. 14, the electrode structure 700 includes a base layer 720 and a plurality of active material plates 730 on an upper surface of the base layer 720. The base layer 720 may include the first active material and the conductive metal, e.g., a complex of the first active material and the conductive metal. Here, the conductive metal may include, but is not limited to, Al, Cu, Ni, Cr, W, Mo, Ag, Au, Pt, Pd, or a combination thereof. The volume fraction of the first active material in the first active material and the conductive meta, e.g., the complex of the first active material and the conductive metal, may be equal to or less than about 30 vol %, based on a total volume of the first active material and the conductive metal, e.g., the complex of the first active material and the conductive metal, but is not limited thereto. The base layer 720 may have an active material density that is less than an active material density of the plurality of active material plates 730. The base layer 720 may have pores in which an electrolyte may be filled. As described above, the base layer 720 additionally includes conductive metal in addition to the first active material, and thus may also function as an electrode current collector layer.

The plurality of active material plates 730 are spaced apart from one another on the upper surface of the base layer 720. The plurality of active material plates 730 may include a second active material. Here, the plurality of active material plates 730 may have an active material density that is greater than an active material density of the base layer 720. For example, a volume fraction of the second active material in the active material plate 730, may be about 80 vol % to about 100 vol %, based on a total volume of the active material plate 730. However, embodiments are not limited thereto.

Since the plurality of active material plates 730 are spaced apart from one another, channels 750 may be formed among the active material plates 730. Here, a channel 750, e.g., each of the channels 750, may have a width corresponding to the distance between the active material plates 730. The channel 750 may extend to a predetermined depth in the base layer 720 between the plurality of active material plates 730 or may be formed to reach, e.g., extend to, the upper surface of the base layer 720. The channel 750 may have various shapes.

Figure 15:
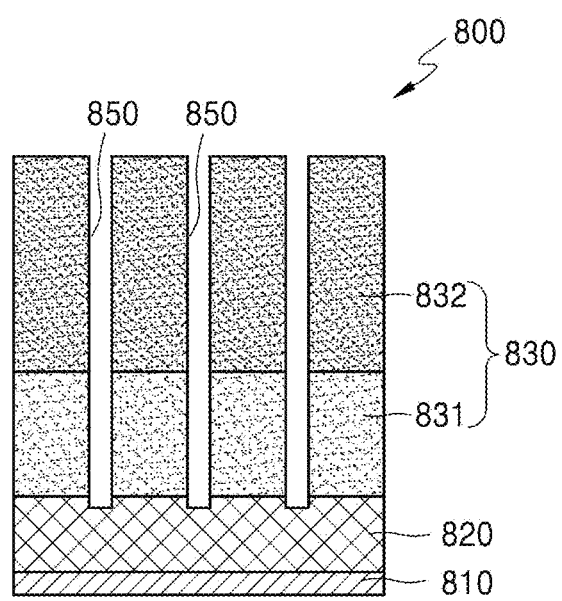
FIG. 15 is a cross-sectional view of an embodiment of an electrode structure.

FIG. 15 is a cross-sectional view of an electrode structure 800 according to an embodiment. Hereinafter, the differences of the electrode structure 800 from the above-described embodiments will be described.

Referring to FIG. 15, the electrode structure 800 includes an electrode current collector layer 810, and a base layer 820 and a plurality of active material plates 830 sequentially provided on the electrode current collector layer 810.

The electrode current collector layer 810 is a cathode current collector layer and may include conductive metal. The base layer 820 provided on an upper surface of the electrode current collector layer 810 may include a first active material having an active material density that is less than an active material density of the active material plates 830. In addition, the base layer 820 may include the first active material and the conductive metal, e.g., a complex of the first active material and the conductive metal, and in this case, the base layer 820 may also function as the electrode current collector layer. Thus, the electrode current collector layer 810 shown in FIG. 15 may be omitted.

The plurality of active material plates 830 are arranged on the upper surface of the base layer 820 to be spaced apart from one another. Since the plurality of active material plates 830 are spaced apart from one another, channels 850 may be formed among the active material plates 830. The channel 850 may extend to a predetermined depth in the base layer 820 between the plurality of active material plates 830 or may be formed to reach, e.g., extend to, the upper surface of the base layer 820. The channel 850 may have various shapes.

The plurality of active material plates 830 may include a second active material having an active material density that is greater than an active material density of the base layer 820. An active material plate 830 of the plurality of active material plates 830, e.g., each of the plurality of active material plates 830, may include a first active material layer 831 and a second active material layer 832 which are sequentially provided on the base layer 820. In an embodiment, the first and second active material layers 831 and 832 may each have an active material density that increases in a direction away from the base layer 820. That is, the second active material layer 832 may have an active material density that is greater than an active material density of the first active material layer 831.

In the above description, the active material plate 830 includes two active material layers, e.g., the first and second active material layers 831 and 832, but the active material plate 830 may include three or more active material layers. In this case, the three or more active material layers may be arranged to have active material densities increasing in a direction away from the base layer 820.

Figure 16:
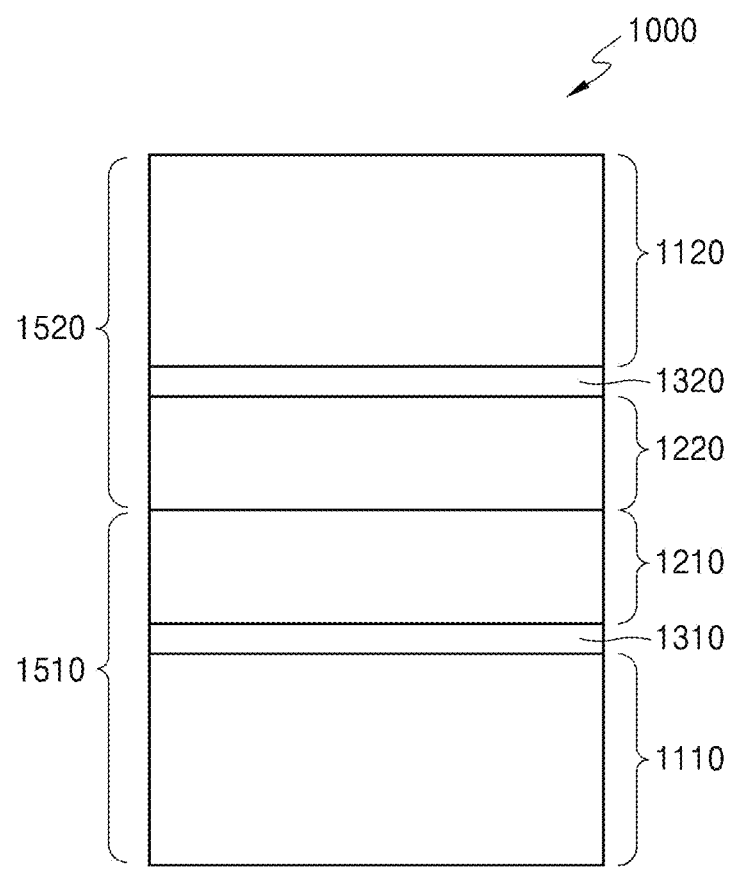
FIG. 16 is a cross-sectional view of an embodiment of a secondary battery.

FIG. 16 is a cross-sectional view of a secondary battery 1000 according to an embodiment.

Referring to FIG. 16, the secondary battery 1000 may have a structure, in which a plurality of unit structures are stacked. FIG. 16 illustrates a case in which the secondary battery 1000 has a structure, in which two unit structures, e.g., first and second unit structures 1510 and 1520, are stacked.

The first unit structure 1510 includes a first electrode structure 1110, a separation film 1210 provided on an upper surface of the first electrode structure 1110, and a second electrode structure 1310 provided on an upper surface of the separation film 1210. Here, the first and second electrode structures 1110 and 1310 may be respectively a cathode structure and an anode structure.

The first electrode structure 1110, that is, the cathode structure, may have a three-dimensional structure, and may include one of the electrode structures 100, 200, 300, 400, 500, 600, 700, and 800 according to the above-described embodiments. Thus, detailed descriptions about the first electrode structure 1110 are omitted.

The separation film 1210 is provided on the upper surface of the first electrode structure 1110, and the second electrode structure 1310 is provided on the upper surface of the separation film 1210. The second electrode structure 1310, that is, the anode structure, may include an anode current collector layer and an anode active material layer.

The anode current collector layer may include conductive metal. The anode active material layer may include an anode active material and a binder, and pores in the anode active material layer may be filled with an electrolyte. The anode active material may include, for example, an anode active material having an excellent electric conductivity such as lithium metal, or may include silicon, carbon, or an oxide anode. However, embodiments are not limited thereto.

The second unit structure 1520 is stacked on the first unit structure 1510. The second unit structure 1520 includes a second electrode structure 1220, a separation film 1320 provided on an upper surface of the second electrode structure 1220, and a first electrode structure 1120 provided on an upper surface of the separation film 1320. Here, the first and second electrode structures 1120 and 1220 are respectively the same as the first and second electrode structures 1110 and 1210 of the first unit structure 1510. Therefore, the first and second electrode structures 1120 and 1220 may be respectively a cathode structure and an anode structure. In addition, the anode current collector layer of the first unit structure 1510 and the anode current collector layer of the second unit structure 1520 may be integrally formed with each other.

In the above description, the secondary battery 1000 has a structure, in which two unit structures, that is, the first and second unit structures 1510 and 1520, are stacked. However, embodiments are not limited thereto, and the secondary battery may have a structure in which three or more unit structures are stacked.

According to an embodiment, the base layer and the active material plates included in the electrode are manufactured through the sintering process, and thus, the base layer and the active material plates may not include a binder for combining the active material and a conductive material for improving an electric conductivity that may be degraded due to inclusion of a binder. Also, since the three-dimensional structure is formed by providing the active material plates to be spaced apart from one another on the base layer in order to guide movement of the lithium ions via the electrolyte having an excellent ion conductivity, the ion conductivity may be improved. When the ion conductivity is improved, the heights of the active material plates may be increased, and accordingly, current density may be improved.

Since the active material density in the base layer is less than the active material density of the active material plate, movement of the lithium ions may be effectively guided towards the electrode current collector layer via the electrolyte in the base layer, thereby improving the ion conductivity. Also, a crystal grain is, e.g., a plurality or all of the crystal grains are, oriented in the direction in which the lithium ions in the active material plate may be moved towards the electrolyte filled in the channel, and the ion conductivity may be further improved. By applying the electrode structure having the three-dimensional structure, a secondary battery having high energy density may be implemented.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electrode structure comprising:
a base layer comprising a first active material;
a plurality of active material plates provided on a first surface of the base layer and spaced apart from one another, the plurality of active material plates comprising a second active material; and
a channel between active material plates of the plurality of active material plates, wherein the channel extends to a predetermined depth in the base layer,
wherein an active material density of the base layer is less than an active material density of an active material plate of the plurality of active material plates.

2. The electrode structure of claim 1, further comprising an electrode current collector layer on a second surface of the base layer, the second layer being opposite the first surface of the base layer.

3. The electrode structure of claim 2, wherein the electrode current collector layer comprises a metal having a conductivity of about $10^3$ Siemens per meter to about $10^7$ Siemens per meter at 20° C.

4. The electrode structure of claim 1, wherein the first active material and the second active material each independently comprise a lithium metal oxide or a lithium metal phosphate.

5. The electrode structure of claim 1, wherein the first active material and the second active material are different in composition.

6. The electrode structure of claim 1, wherein the first active material has the same composition as the second active material.

7. The electrode structure of claim 1, wherein a volume fraction of the first active material is in a range from about 50 volume percent to about 90 volume percent, based on a total volume of the base layer.

8. The electrode structure of claim 1, wherein a volume fraction of the second active material is in a range from about 80 volume percent to about 100 volume percent, based on a total volume of the plurality of active material plates.

9. The electrode structure of claim 1, wherein the base layer has a height of about 5 micrometers to about 200 micrometers.

10. The electrode structure of claim 1, wherein the base layer comprises a conductive metal having a conductivity of $10^3$ to $10^7$ Siemens per meter at 20° C. and the first active material.

11. The electrode structure of claim 10, wherein the conductive metal comprises aluminum, copper, nickel, cobalt, chromium, tungsten, molybdenum, silver, gold, platinum, lead, or a combination thereof.

12. The electrode structure of claim 10, wherein a volume fraction of the conductive metal is about 0.1 volume percent to about 30 volume percent, based on a total volume of the conductive metal having a conductivity of $10^3$ to $10^7$ Siemens per meter at 20° C. and the first active material.

13. The electrode structure of claim 1, wherein an active material plate of the plurality of active material plates comprises a plurality of active material layers that are stacked from the base layer.

14. The electrode structure of claim 13, wherein an active material density of an active material layer of the plurality of active material layers increases in a direction away from the base layer.

15. The electrode structure of claim 1, wherein the plurality of active material plates define a width direction, a length direction, and a height direction, and
the plurality of active material plates are spaced apart from one another in the width direction.

16. The electrode structure of claim 15, wherein a distance between adjacent active material plates is greater than 0 micrometers and equal to or less than about 50 micrometers.

17. The electrode structure of claim 15, wherein at least one of the plurality of active material plates has a length that is different from a length of another active material plate.

18. The electrode structure of claim 15, wherein a width of an active material plate of the plurality of active material plates is equal to or greater than about 10 micrometers.

19. The electrode structure of claim 15, wherein a height of an active material plate of the plurality of active material plates is greater than a width of an active material plate of the plurality of active material plates.

20. The electrode structure of claim 19, wherein a height of an active material plate of the plurality of active material plates is in a range from about 20 micrometers to about 1,000 micrometers.

21. The electrode structure of claim 15, wherein an angle between a direction perpendicular to a surface of an active material plate of the plurality of active material plates and an oriented direction of a crystal grain in the active material plate is about 1° to about 45°.

22. The electrode structure of claim 21, wherein the oriented crystal direction of the crystal grain is a <100>, <010>, <110>, <101>, <012>, <104>, <113>, or <021> direction.

23. The electrode structure of claim 1, wherein the plurality of active material plates define a width direction, a length direction, and a height direction, and the plurality of active material plates are spaced apart from one another in the length direction.

24. The electrode structure of claim 1, wherein the base layer does not comprise a binder.

25. The electrode structure of claim 1, wherein the active material plates do not comprise a binder.

26. A secondary battery comprising:
a first electrode structure and a second electrode structure spaced apart from each other; and
a separation film between the first electrode structure and the second electrode structure,
wherein the first electrode structure comprises
a base layer comprising a first active material;
a plurality of active material plates provided on a first surface of the base layer and spaced apart from one another, the plurality of active material plates comprising a second active material; and
a channel between active material plates of the plurality of active material plates, wherein the channel extends to a predetermined depth in the base layer, wherein an active material density of the base layer is less than an active material density of an active material plate of the plurality of active material plates.

27. The secondary battery of claim 26, wherein the first electrode structure and the second electrode structure are respectively a cathode structure and an anode structure.

28. The secondary battery of claim 26, wherein the first electrode structure further comprises an electrode current collector layer on a second surface of the base layer, the second layer being opposite the first surface of the base layer.

29. The secondary battery of claim 26, further comprising an electrolyte disposed in the channel between active material plates of the plurality of active material plates.

30. The secondary battery of claim 26, wherein the base layer comprises a conductive metal having a conductivity of about $10^3$ Siemens per meter to about $10^7$ Siemens per meter at 20° C. and the first active material.

31. The secondary battery of claim 26, wherein an active material plate of the plurality of active material plates comprises a plurality of active material layers that are stacked from the base layer, and wherein an active material density of an active material layer of the plurality of active material layers increases in a direction away from the base layer.

32. A secondary battery comprising:
a first electrode structure and a second electrode structure spaced apart from each other; and
a separation film between the first electrode structure and the second electrode structure,
wherein the first electrode structure comprises:
a porous base layer comprising a first active material;
a plurality of active material plates provided on a first surface of the base layer and spaced apart from one another to define a channel between adjacent active material plates, the plurality of active material plates comprising a second active material, wherein the channel extends to a predetermined depth in the base layer; and
electrolyte in the channel between adjacent active material plates and in pores in the base layer connected to the channel between adjacent active material plates,
wherein a volume fraction of the first active material is in a range from about 50 volume percent to about 90 volume percent, based on a total volume of the base layer, and
wherein a volume fraction of the second active material is in a range from about 80 volume percent to about 100 volume percent, based on a total volume of the plurality of active material plates, and
wherein an active material density of the base layer is less than an active material density of an active material plate of the plurality of active material plates.

* * * * *